United States Patent Office 3,686,113
Patented Aug. 22, 1972

3,686,113
SILICA PIGMENTS AND ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,215, Sept. 16, 1968, which is a division of application Ser. No. 611,250, Jan. 24, 1967, now Patent No. 3,523,096, which in turn is a continuation-in-part of applications Ser. No. 458,420 and Ser. No. 458,379, both May 24, 1965, and Ser. No. 479,806, Aug. 16, 1965, now Patent No. 3,401,017. This application July 16, 1970, Ser. No. 55,458
Int. Cl. C08c 11/10; C08d 9/00
U.S. Cl. 260—33.6 AO
6 Claims

ABSTRACT OF THE DISCLOSURE

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried therefrom after its precipitation, with (2) a quantity of olephilic quaternary ammonium material, (3) combining the resulting treated wet silica pigment with an aqueous dispersion of the elastomer containing an anionic dispersing agent, with or without (4) carbon black and/or processing oil, and (5) with selected reactant-coagulant, and (b) recovering the resulting coagulum as a masterbatch, the steps prior to (b) having rendered the serum of the aqueous mixture essentially free of silica pigment. Prior to combination with the elastomer dispersion the treated alkaline silica pigment may be recovered as a useful dispersible alkaline silica pigment product, or the wet pigment may be treated with water soluble salts of aluminum or zinc and/or with mineral acid, as well as with the oleophilic material, and after such treatment the resulting pigment composition may be recovered from the slurry as a useful dispersible silica pigment product, or the so treated wet silica pigment may be combined as in (3), (4) and (5) above, and be recovered as in (b) above in the form of a masterbatch.

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. 3,523,096, said application Ser. No. 611,250 having been a continuation-in-part of earlier applications Ser. No. 458,420, filed May 24, 1965, now abandoned; Ser. No. 458,379, filed May 24, 1965, now abandoned; and Ser. No. 479,806, filed Aug. 16, 1965, now U.S. Pat. 3,401,017, the disclosures of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION (1) Field of the invention

The field to which this invention pertains is the preparation of dispersible silica pigments and of masterbatches from latices (i.e. aqueous dispersion) of elastomers and aqueous slurries of preciptated silica pigments.

(2) Description of the prior art

It is well known in the art that attempts to make mastebatches from elastomer latex and aqueously dispersed hydrated silica pigment by latex masterbatching have resulted in loss of large amounts of the hydrated silica pigment in the mother liquor and in non-uniform masterbatches, and that even the addition of tetraethylene pentamine (Whitby, Synthetic Rubber, John Wiley & Sons, Inc., New York, 1954, page 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market, nor are the dispersible dry silica pigment compositions provided by this invention known.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e. the formation of silica gel)—and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state from aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing sige (e.g. minimizing the pigment aggregation problem); and the present invention provides a process for accomplishing these ends by forming the masterbatch from aqueously wet hydrated silica pigment precipitates having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Figure 1:
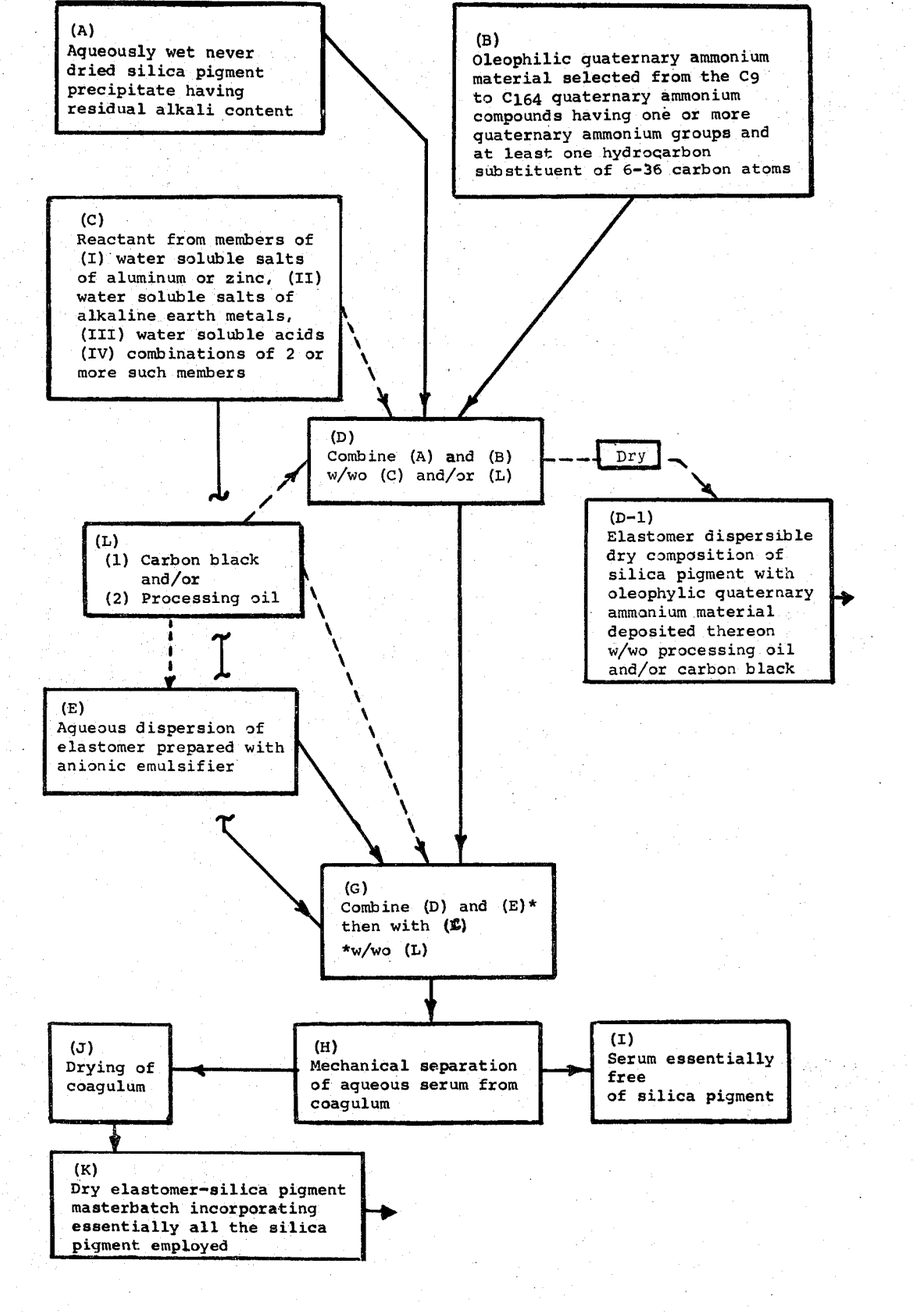

Thus, the present invention, inter alia, provides a simple and efficient process for the curbing of silica pigment losses and the promotion of uniformity of product in the preparation of masterbatches of measured silica pigment content. As shown in the drawing, the first part of the process comprises the steps of:

(A) providing 5 to 100 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation;

(B) providing a quantity of from 0.1 to 20% by weight, based on the silica, pigment, dry basis, referred to in step (D), if oleophilic quaternary ammonium material e.g. from the category consisting of the quaternary ammonium compounds having at least one hydrocarbon or halohydrocarbon substituent containing 6 to 36 carbon atoms;

(C) providing reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of any two or more of such members; and (D) combining the wet silica pigment—from (A)—with the oleophilic material—from (B)—and from 0 to at least a stoichiometric equivalent, based on the alkalinity of the silica pigment, dry basis, of the reactant—from (C)—thereby to form an aqueously wet rubber dispersible silica pigment composition.

Silica pigment compositions so provided may be dried to yield useful dispersible dry slica pigment compositions as indicated at (D-1), or may be used without drying, e.g. in the second part of the masterbatching process, by (E) providing an aqueous dispersion containing (1) 1000 parts by weight of the elastomer and (2) from 0.5 to 15 parts by weight of anionic dispersing agent;

(G) forming a mixture of (1) the aqueous elastomer dispersion—from (E)—(2) the treated wet silica pigment —from (D)—(3) from 0 to 75 parts by weight of carbon black—from (L)—with the limitation that the total of silica pigment and carbon black, dry basis, not exceed 80 parts by weight, (4) from 0 to 45 parts by weight of processing oil—from (L)—and (5) a sufficient quantity of the reactant material—from (C)—to cause coagulation of the solids rendering the aqueous serum of the combination essentially free of silica pigment; and (H)–(K) recovering the coagulum as a masterbatch. In preferred embodiments, respectively: (1) step (B) is practiced by pre-mixing the aqueous elastomer -dispersion—from (E)—with the treated wet silica pigment—from (D)—and then combining such mixture with the reactant material referred to in step (G); (2) in step (B) at least 0.5%, based on the silica pigment, dry basis, by weight, of the oleophilic material is provided; (3) at least 5 parts by weight of the carbon black is included in the mixture formed at (D) and/or (G); and (4) at least 5 parts by weight of processing oil is included in the mixture at (D) and/or (G).

Under the foregoing conditions the steps prior to the recovery render the serum resulting from the coagulum essentially free of silica pigment, thus assuring a uniform silica pigment content in the masterbatch. The achievement of this desideratum is evidenced by the fact that when the coagulum is mechanically removed from the serum as indicated at (H), the serum (I) is found to be essentially free of silica pigment.

The principal processes, and especially the preferred embodiments thereof, produce pigment and masterbatch products useful for the rubber industry.

In the making of the dispersible pigment compositions the reactant—from (C)—is employed in an amount of from 0 to at least stoichiomatic equivalent based on the alkalinity of the silica pigment; the carbon black—from (L)—in the range of 0 to 1500 parts per 100 parts of the silica pigment, dry basis by weight, and the processing oil —from (L)—in the range of 0 to 45 parts by weight per 80 parts of dry solids of the mixture.

In the following description of preferred embodiments, Examples 3 to 5, 7 to 18 and 27 to 30 are embodiments of the over-all process of preparing the silica composition and masterbatch, in which the conditions are such that all the metal salt employed is confined to the coaguland (F), those other than Examples 6 and 27–30 are of embodiments thereof in which reactant (C) is also used; Examples 19–22 are of preparation and drying of the new alkaline dispersible silica pigment composition without reactant (C); Examples 19–26 are of the preparation of dispersible alkaline, neutral or acidic silica pigment compositions with or without aluminum and/or zinc included therein; and Examples 31–46 are for embodiments producing elastomer/silica pigment masterbatches further containing carbon black and/or processing oil.

DESCRIPTION OF THE PREFERRED EMBODIMENTS

Preferred embodiments of the present invention avoid the use of organic additives such as tetraethylene pentamine, glue, gelatin, casein, etc., which increase the cost and may effect the curing properites of the masterbatch. The invention, inter alia, may be used to improve wet silica masterbatching and masterbatches using any aqueously wet never dried silica pigment containing bound alkali, and is applicable to the formation of masterbatches therewith with elastomer latices prepared with anionic emulsifier of the type coagulable with metal salts of the coagulant. The present invention does not rely for patentability on the use of latices of hydrocarbon rubbers formed with polar vinylidene (including vinyl) monomers that are primary amines, secondary amines, tertiary amines, or quaternary ammonium compounds, or having hydroxyl groups, which uses are claimed in separate applications filed concurrently herewith. It may employ latices of diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g. butadiene-styrene, butadiene-acrylonitrile or methacrylonitrile, butadiene-acrylate or methacrylate ester; and rubbery copolymers of hydrocarbon monomers with polar vinylidene (including vinyl) monomers, as well as mixtures and combinations thereof with processing oils, herein referred to as oil-rubber-silica masterbatches, and any of the foregoing further including other cooperating ingredients, such as carbon black, providing the silica pigment comprises an essential component of the e.g. carbon black-elastomer-silica masterbatch.

Silica pigments containing residual alkali suitable for masterbatching in accordance with the present invention are precipitated by the gradual acidulation with carbon dioxide of aqueous sodium silicate solution.

The oleophilic quaternary ammonium materials suitable to aid in the masterbatching of silica in accordance with the present invention contain from 6 to 76 carbon atoms and may be prepared by reacting quaternizing agents such as alkyl halides, e.g. methyl chloride, methyl bromide, aralkyl halides e.g. benzyl chloride, alkyl sulfonates or alkyl phosphates e.g. dimethyl sulfate, or the like, with amine compounds having at least one tertiary amine group and having at least one hydrocarbon substituent which contains 6 to 36 carbon atoms and which may comprise groups of straight chain, branched chain, cyclic and/or aryl configuration, and which may include substituent groups containing oxygen, nitrogen, sulfur, phosphorous, fluorine or chlorine atoms. Included among such quaternary ammonium compounds, but not limiting thereof are the following categories:

(1) The quaternary ammonium compounds derived from tertiary monoamines such as those represented by the formulas:

| Amine tertiary | Quaternizing agent | Quaternary ammonium compound |
|---|---|---|
| $\begin{array}{c} R \\ R'-N \\ R'' \end{array}$ | $CH_3Cl$, methyl chloride | $\left[\begin{array}{c} R \\ R'-N-CH_3 \\ R'' \end{array}\right]^+ Cl^-$ |
| Same as above | $C_6H_5CH_2Cl$, benzyl chloride | $\left[\begin{array}{c} R \\ R'-N-CH_2C_6H_5 \\ R'' \end{array}\right]^+ Cl^-$ |
| $\begin{array}{c} CH_2-CH_2 \\ O \hspace{10pt} N-R \\ CH_2-CH_2 \end{array}$ | $CH_3Cl$ | $\left[\begin{array}{c} CH_2CH_2 \hspace{10pt} R \\ O \hspace{10pt} N \\ CH_2CH_2 \hspace{10pt} CH_3 \end{array}\right]^+ Cl^-$ | in which R contains 6 to 36 carbon atoms, R' contains 1 to 36 carbon atoms and R'' contains 1 to 36 carbon atoms. This category includes but is not limited to the so quaternized products of trihexyl amine, tridodecyl amine, tristearyl amine, octyldimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and the quaternization products of the long chain cyclic tertiary amines including but not limited to N-coco morpholine, N-soya morpholine, N-tallow morpholine and the like, some of which are commercially available under the trademark designations "Arquad."

(2) The quaternary ammonium compounds derived from diamines and represented by the formulas:

| Amine tertiary | Quaternizing agent | Quaternary ammonium compound |
|---|---|---|
| $\begin{array}{c} R \hspace{20pt} R'' \\ N-(CH_2)_x-N \\ R' \hspace{20pt} R' \end{array}$ | $CH_3Cl$ | $\left[\begin{array}{c} R \hspace{20pt} R'' \\ N-(CH_2)_x-N-CH_3' \\ R' \hspace{20pt} R''' \end{array}\right]^+ Cl^-$ | in which R contains 6 to 36 carbon atoms, R', R'', R''' contain each 1 to 36 carbon atoms and $x$ is an integer from 1 to 18, e.g. Redicote E-11, a trademarked product (reported to have the formula identified in Table VIII).

(3) The quaternary ammonium compounds derived from long-chain polyethoxylated and polypropoxylated amines and represented by the formulas:

| Tertiary amine | Quaternizing agent | Quaternary compound |
|---|---|---|
| $\begin{array}{c} R \\ N-(CH_2CH_2O)_{x_1}H \\ R' \end{array}$ | $CH_3Cl$ | $\left[\begin{array}{c} R \\ N(CH_2CH_2O)_{x_1}H \\ R' \hspace{10pt} CH_3 \end{array}\right]^+ Cl^-$ |
| $\begin{array}{c} R \\ N-CH_2CH_2CH_2O)_{x_2}H \\ R' \end{array}$ | $CH_3Cl$ | $\left[\begin{array}{c} R \\ N(CH_2CH_2CH_2O)_{x_2}H \\ R' \hspace{10pt} CH_3 \end{array}\right]^+ Cl^-$ |
| $\begin{array}{c} (CH_2CH_2O)_{x_3}H \\ R-N \\ (CH_2CH_2O)_{y_1}H \end{array}$ | $CH_3Cl$ | $\left[\begin{array}{c} (CH_2CH_2O)_{x_3}H \\ R-N \\ (CH_2CH_2O)_{y_1}H \\ CH_3 \end{array}\right]^+ Cl^-$ |
| $\begin{array}{c} (CH_2CH_2CH_2O)_{x_4}H \\ R-N \\ (CH_2CH_2CH_2O)_{y_2}H \end{array}$ | $CH_3Cl$ | $\left[\begin{array}{c} (CH_2CH_2CH_2O)_{x_4} \\ R-N \\ (CH_2CH_2CH_2O)_{y_2}H \\ CH_3 \end{array}\right]^+ Cl^-$ | in which R contains 6 to 36 carbon atoms and R' contains 1 to 36 carbon atoms and $x_1$, $x_2$, $x_3$, $x_4$, $y_1$, $y_2$ are each integers from 1 to 30. This category includes but is not limited to coco amine, soybean amine, tallow amine and stearyl amine each reacted with a plurality e.g. 2, 5, 10, or 15, moles of ethylene oxide or propylene oxide per mole of amine and quaternized, and the like; e.g. those commercially available under the trademark "Ethoquad."

(4) The quaternary ammonium compounds derived from long-chain polyethoxylated and polypropoxylated diamines and represented by the formula in which R contains 6 to 36 carbon atoms and $x$, $y$ and $z$ are integers from 1 to 30.

This category includes, but is not limited to, the quaternized products of N-coco trimethylene diamine, N-soya trimethylene diamine and N-tallow trimethylene diamine each with a plurality, e.g. 3, 10 or 20 moles of ethylene oxide or propylene oxide per mole of amine, and the like.

(5) Other types of quaternary ammonium compounds in which R contains from 6 to 36 carbon atoms include the following:

(a)

as for example when, $R=C_{17}H_{35}$, Aerosol SE, a trademarked product, (b)

as for example, when $R=C_8H_{17}$, Hyamine 1622, a trademark product.

(c)

as for example, when $R=C_{17}H_{35}$, Zelan, a trademark product, and other compounds prepared by reacting fatty acid amides with formaldehyde (e.g. paraformaldehyde) with a tertiary base such as pyridine, alkylpyridine or quinoline.

(d)

as for example, when $R=C_{11}H_{23}$, Emulsept, a trademark product.

(e)

as for example, when $R=C_{18}H_{37}$, Triton K-60, a trademark product.

It is to be understood that the oleophilic quaternary ammonium compounds include the oleophilic quaternary ammonium amine compounds but do not include the oleophilic amines containing only primary, secondary and/or tertiary amine groups or their acid salts, as the combinations of such oleophilic amines with silica pigments and masterbatches thereof are included in a copending U.S. patent application filed concurrently herewith.

The oleophilic quaternary ammonium compounds are for the most part only slightly water soluble compounds and are applied to the aqueously wet silica pigment in a volatile solvent therefor, such, for example, as isopropanol. In certain instances the oleophilic quaternary ammonium compounds may be combined with the aqueous silica slurry without the aid of solvent by mechanical working, as in a high shear mixer, and when polyalkoxylated the oleophilic material may be water soluble.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticizers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex–20, –419, –726, –757, –787 (TM), and Califlux TT (TM) and other oils suitable for rubber compounding or the oil extension of synthetic rubber; (d) the coumarone-indene oils and resins, e.g. Cumar Resin RH, –P10, –T(TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125 (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

EXAMPLES

The following examples will serve to illustrate the invention in more detail:

Silica preparation

The aqueously wet never dried alkaline silica pigment employed in all the examples was prepared in a manner similar to Example 9 of U.S. Pat. No. 3,250,594 except that the ratio of 41° Bé. commercial sodium silicate $(Na_2O/(SiO_2)_{3.22})$ to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueously wet silica pigment was designated wet alkaline silica pigment-I, and had a bound and residual alkali content of about 1.5% by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2 - methylene - bis (4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolyguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged over-night, re-milled and cured for 45 minutes at 287° F.

The physical test data for the vulcanizate so prepared with the foregoing silica pigment is set forth in Table II hereof.

TABLE II

Silica Tested (in Vulcanizate)— Silica Pigment-II

| | |
|---|---|
| Hardness (Shore A) | 72 |
| Tensile (p.s.i.) | 3530 |
| Modulus (300%) | 1140 |
| Elong. (percent) | 575 |

In Examples 1–18 and 27–46 the latices and the treated wet silica pigment were blended together by low speed stirring before combining them with the coagulant. In Examples 4–6 and 27–30 while still stirirng the latex/treated silica pigment combination, the coagulant-aqueous solution was progressively added until coagulation throughout the mixture occurred, and on separation of the coagulum from the aqueous phase the serum was essentially free of silica pigment.

In the case of Examples 1 to 3 and 10–18, the blended polymer latex and treated silica pigment slurry were run into the coagulating solution while stirring, and this procedure also yielded a coagulum comprising essentially all of the elastomer and silica pigment, leaving the serum completely or essentially free of the pigment.

It has also been found that streams of the elastomer latex and the treated silica pigment slurry may be continuously mixed and the resulting stream then mixed with a stream of the coagulant, as illustrated in Examples 7 to 9, and that this procedure also will yield a coagulum containing essentially all of the silica pigment, leaving essentially no silica pigment in the aqueous phase. Thus the processes of the examples are adaptable for either continuous or batch production of the masterbatch.

When an oil-rubber-silica pigment masterbatch is desired, up to about 45% of oil based on the elastomer is added to the latex prepared with anionic emulsifier according to the foregoing examples, preferably with a small amount of ammonium hydroxide to aid dispersion of the oil into the elastomer, and it will thus be understood that the masterbatch and elastomer dispersion contemplated by the invention may contain a minor proportion of oil. (See also Examples 31, 39, 42, 45 and 46.)

In examples employing aluminum salts, any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer latex and/or the aqueous dispersion of silica pigment and/or the aqueous coagulant solution may contain a small proportion of ammonium hydroxide which appears in certain instances to facilitate practice of the invention.

When carbon black is also to be included in the elastomer-silica pigment masterbatch, it preferably is incorporated in the slurry of treated wet silica pigment. (See Examples 31–38 and 4–46.)

In the following tabulations of Examples 1–46 the ingredients (A), (B), (C), etc. are listed in the order of their addition, except where otherwise specifically set forth. These examples were carried out at ambient temperatures, however, more elevated temperatures may be employed, e.g. to accelerate the processing.

The term "water-soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

TABLE III.—POLYMER-SILICA MASTERBATCH
[Parts by weight]

| Examples | 1 | 2 | 3 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 2% aluminum sulfate [4] | 55 | | |
| 2% zinc sulphate | | 45 | |
| 2% sulfuric acid | | | 25.5 |
| Silica slurry pH | 5.0 | 6.5 | 7.0 |
| (C) Oleophilic quaternary ammonium compound: 10% Hyamine 1622 [1] | 1.5 | 1.5 | 1.5 |
| (D) Polymer latex: | | | |
| Butadiene-styrene [2] | 153 | 153 | 153 |
| Dry solids basis | 30 | 30 | 30 |
| Antioxidant [3] | 0.6 | 0.6 | 0.6 |
| Water | 150 | 150 | 150 |
| (E) Coagulant-aqueous solution: | | | |
| 2% aluminum sulfate [4] | 85 | | |
| 2% calcium chloride | | 80 | |
| 2% sulfuric acid | | | 40 |
| Water | 500 | 500 | 500 |
| (F) Coagulation: | | | |
| Added treated silica plus polymer latex to coagulant (X) | X | X | X |
| pH serum | 4.5 | 6.4 | 3.5 |
| Silica in serum | None | None | None |
| (G) Masterbatch: | | | |
| Filtered and washed (X) | X | X | X |
| Dried (105° C.) (X) | X | X | X |

[1] Hyamine 1622—Diisobutylphenoxyethoxyethyl dimethyl benzyl ammonium chloride, monohydrate, in isopropanol.
[2] SBR-1502 (T.S.=19.7%). (Of the solids about 5% is anionic emulsifier.)
[3] Antioxidant is 2,2-methylene-bis(4-methyl-6-t.-butylphenol).
[4] Aluminum sulfate=$Al_2(SO_4)_3 \cdot 14H_2O$.

Note: In Examples 1, 2, and 3 the polymer latex and silica treated with the surfactant were combined and run into the coagulant solution, with stirring.

TABLE IV.—POLYMER-SILICA MASTERBATCH
[Parts by weight]

| Examples | 4 | 5 | 6 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 10% sulfuric acid | 5.1 | 5.1 | |
| Silica slurry (pH filter cake after washing) | 7 | 7 | |
| (C) Oleophilic quaternary ammonium compound: 10% Hyamine 10-X [1] | 1.5 | 1.5 | 1.5 |
| (D) Polymer latex: | | | |
| Butadiene-styrene [2] | 153 | 153 | 153 |
| Dry solids basis | 30 | 30 | 30 |
| Antioxidant [3] | 0.6 | 0.6 | 0.6 |
| Water | 150 | 150 | 150 |
| (E) Coagulant-aqueous solution: | | | |
| 2% aluminum sulfate [4] | 70 | | |
| 2% calcium chloride | | 85 | |
| 2% sulfuric acid | | | 53 |
| Water | 500 | 500 | 500 |
| (F) Coagulation: | | | |
| Added coagulant to treated silica plus polymer latex (X) | X | X | X |
| pH serum | 4.5 | 6.8 | 2.5 |
| Silica in serum | None | None | None |
| (G) Masterbatch: | | | |
| Filtered and washed (X) | X | X | X |
| Dried (105° C.) (X) | X | X | X |

[1] Hyamine 10-X=Diisobutylcresoxyethoxyethyl dimethyl benzyl ammonium chloride monohydrate, a trademark product, in isopropanol.
[2] SBR-1502 (T.S.=19.7%).
[3] Antioxidant is 2,2-methylene-bis(4-methyl-6-t.-butylphenol).
[4] Aluminum sulfate=Al₂(SO₄)₃·14H₂O.

TABLE V.—POLYMER-SILICA MASTERBATCH
[Parts by weight]

| Examples | 7 | 8 | 9 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 10% sulfuric acid | 5.1 | 5.1 | 5.1 |
| Silica slurry, pH (filter cake after washing) | 7 | 7 | 7 |
| (C) Oleophilic quaternary Ammonium compound: 10% Arquad S-50 [1] | 3.0 | 3.0 | 3.0 |
| (D) Polymer Latex: | | | |
| Butadiene-styrene [2] | 153 | 153 | 153 |
| Dry solids basis | 30 | 30 | 30 |
| Antioxidant [3] | 0.6 | 0.6 | 0.6 |
| Water | 150 | 150 | 150 |
| (E) Coagulant-aqueous solution: | | | |
| 2% aluminum sulfate [4] | 100 | | |
| 2% calcium chloride | | 80 | |
| 2% sulfuric acid | | | 40 |
| Water | 500 | 500 | 500 |
| (F) Coagulation: | | | |
| Treated silica, polymer latex and then coagulant were continuously combined (X) | X | X | X |
| pH serum | 4.5 | 6.8 | 3.5 |
| Silica in serum | None | None | None |
| (G) Masterbatch: | | | |
| Filtered and washed (X) | X | X | X |
| Dried (105° C.) (X) | X | X | X |

[1] Arquad S-50, a trademark product, soya trimethyl ammonium chloride, 50% active, in isopropanol.
[2] SBR-1502 (T.S.=19.7%).
[3] Antioxidant is 2,2-methylene-bis(4-methyl-6-t.-butylphenol).
[4] Aluminum sulfate=Al₂(SO₄)₃·14H₂O.

TABLE VI.—POLYMER-SILICA MASTERBATCH
[Parts by weight]

| Examples | 10 | 11 | 12 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 10% sulfuric acid | 5.1 | 5.1 | 5.1 |
| Silica slurry, pH (filter cake after washing) | 7 | 7 | 7 |
| (C) Oleophilic quaternary ammonium compound: 10% Arquad 2C-75 [1] | 2.0 | 2.0 | 2.0 |
| (D) Polymer latex: | | | |
| Butadiene-styrene [2] | 153 | 153 | 153 |
| Dry solids basis | 30 | 30 | 30 |
| Antioxidant [3] | 0.6 | 0.6 | 0.6 |
| Water | 150 | 150 | 150 |
| (E) Coagulant-aqueous solution: | | | |
| 2% aluminum sulfate [4] | 95 | | |
| 2% calcium chloride | | 80 | |
| 2% sulfuric acid | | | 45 |
| Water | 500 | 500 | 500 |
| (F) Coagulation: | | | |
| Added treated silica plus polymer latex to coagulant (X) | X | X | X |
| pH serum | 4.0 | 6.8 | 2.5 |
| Silica in serum | None | None | None |
| (G) Masterbatch: | | | |
| Filtered and washed (X) | X | X | X |
| Dried (105° C.) (X) | X | X | X |

[1] Arquad 2C-75, a trademark product, dicoco dimethyl ammonium chloride, 75% active, in isopropanol.
[2] SBR-1502 (T.S.=19.7%).
[3] Antioxidant is 2,2-methylene-bis(4-methyl-6-t.-butylphenol).
[4] Aluminum sulfate=Al₂(SO₄)₃·14H₂O.

NOTE: In Examples 10, 11 and 12 the polymer latex and silica treated with the cationic surfactant were combined and run into the coagulant solution, with stirring.

TABLE VII.—POLYMER-SILICA MASTERBATCH
[Parts by weight]

| Examples | 13 | 14 | 15 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 10% sulfuric acid | 5.1 | 5.1 | 5.1 |
| Silica slurry, pH (filter cake after washing) | 7 | 7 | 7 |
| (C) Oleophilic quaternary ammonium compound: 10% Arquad 2C-75 [1] | 2 | 2 | 2 |
| (D) Polymer latex: | | | |
| Butadiene-acrylonitrile [2] | 63 | | |
| Butadiene-acrylonitrile [3] | | 61 | |
| Chloroprene [4] | | | 43 |
| Dry solids basis | 25 | 25 | 25 |
| Antioxidant [3] | 0.5 | 0.5 | 0.5 |
| Water | 180 | 180 | 180 |
| (E) Coagulant-aqueous solution: | | | |
| 2% aluminum sulfate [5] | 100 | 85 | 75 |
| Water | 500 | 500 | 500 |
| (F) Coagulation: | | | |
| Added treated silica plus polymer latex to coagulant (X) | X | X | X |
| pH serum | 4.0 | 4.0 | 4.0 |
| Silica in serum | None | None | None |
| (G) Masterbatch: | | | |
| Filtered and washed (X) | X | X | X |
| Dried (105° C.) (X) | X | X | X |

[1] Arquad 2C-75, a trademark product, dicoco dimethyl ammonium chloride, in ispropanol.
[2] Hycar 1570 X 20, a trademark product which is a carboxyl-modified butadiene acrylonitrile latex.
[3] Hycar 1561, a trademark product which is a butadiene/acrylonitrile latex.
[4] Neoprene 635 latex, a trademark product.
[5] Aluminum sulfate=Al₂(SO₄)₃·14H₂O.

NOTE.—Masterbatch balled-up.

TABLE VIII.—POLYMER SILICA MASTERBATCH
[Parts by weight]

| Examples | 16 | 17 | 18 |
|---|---|---|---|
| (A) Silica pigment slurry: | | | |
| Alkaline silica pigment-I (pH 8.5) | 150 | 150 | 150 |
| Dry solids basis | 15 | 15 | 15 |
| Water | 50 | 50 | 50 |
| (B) Reagent-aqueous solution: | | | |
| 10% sulfuric acid | 5.1 | 5.1 | 5.1 |
| Silica slurry, pH (filter cake after washing) | 7 | 7 | 7 |
| (C) Oleophilic quaternary ammonium compound: 10% Redicote E-11 [1][5] | 1 | 1 | 1 |
| (D) Polymer latex: | | | |
| Butadiene-styrene [2] | 153 | 153 | 153 |
| Dry solids basis | 30 | 30 | 30 |
| Antioxidant [3] | 0.6 | 0.6 | 0.6 |
| Water | 150 | 150 | 150 |
| (E) Coagulant-aqueous solution: | | | |
| 2% aluminum sulfate [4] | 90 | | |
| 2% calcium chloride | | 100 | |
| 2% sulfuric acid | | | 40 |
| Water | 250 | 250 | 250 |
| (F) Coagulation: | | | |
| Added treated silica and polymer latex to coagulant (X) | X | X | X |
| pH serum | 4.5 | 6.8 | 3.5 |
| Silica in serum | None | None | None |
| (G) Masterbatch: | | | |
| Filtered and washed (X) | X | X | X |
| Dried (105° C.) (X) | X | X | X |

[1] Reported to be $C_{18}H_{37}N(CH_3)_2ClC_3H_6N(CH_3)_3Cl$, a trademark product.
[2] SBR-1502 (TS=19.7%).
[3] The antioxidant is 2,2'-methylene-bis (4-methyl-6-t.-butylphenol).
[4] Aluminum sulfate=Al₂(SO₅)₃·14H₂O.
[5] In isopropnaol.

TABLE IX.—DISPERSIBLE SILICA
[Parts by weight]

| Examples | 19 | 20 | 21 | 22 |
|---|---|---|---|---|
| (A) Silica slurry: | | | | |
| Alkaline silica pigment-I (pH 8.5) | 150 | 150 | 150 | 150 |
| Dry solids basis | 15 | 15 | 15 | 15 |
| Water | 50 | 50 | 50 | 50 |
| (B) Oleophilic quaternary ammonium compound: | | | | |
| Arquad C-50 [1][5] | 1.5 | | | |
| Arquad T-50 [2][5] | | 3.0 | | |
| Ethoquad 18/12 [3][5] | | | 6.0 | |
| Redicote E-11 [4][5] | | | | 3.0 |
| Water | 200 | 200 | 200 | 200 |
| (C) Treated silica: Dried (105° C.) (X) | X | X | X | X |

[1] Arquad C-50—Coco-trimethyl ammonium chloride 50% active, a trademark product.
[2] Arquad T-50—tallow trimethyl ammonium chloride, a trademark product, 50% active.
[3] Ethoquad 18/12, a trademark product of the structure

[4] Redicote E-11, a trademark product reported to be

[5] In isopropanol.

TABLE X.—DISPERSIBLE SILICA
[Parts by weight]

| Examples | 23 | 24 | 25 | 26 |
|---|---|---|---|---|
| (A) Silica slurry: | | | | |
| Alkaline silica pigment-I (pH 8.5) | 150 | 150 | 150 | 150 |
| Dry solids basis | 15 | 15 | 15 | 15 |
| Water | 50 | 50 | 50 | 50 |
| (B) Reagent aqueous solution: | | | | |
| 2% aluminum sulfate [1] | 18 | | | 19 |
| 2% zinc sulfate | | 20 | | |
| 2% sulfuric acid | | | 8.5 | 4.5 |
| Silica slurry, pH | 5.0 | 6.5 | 7.0 | 6.0 |
| (C) Oleophilic quaternary ammonium compound: | | | | |
| Arquad C-50 [1] | 1.0 | 2.0 | | |
| Arquad T-50 [2] | | | 1.5 | 3.0 |
| (D) Treated silica: Dried (105° C.) (X) | X | X | X | X |

[1] Arquad C-50—Coco-trimethyl quaternary ammonium chloride 50% active, a trademark product, in isopropanol.
[2] Arquad T-50—tallow-trimethyl quaternary ammonium chloride 50% active, a trademark product, in isopropanol.

TABLE XI.—POLYMER-SILICA MASTERBATCH
[Parts by weight]

| Examples | 27 | 28 | 29 | 30 |
|---|---|---|---|---|
| (A) Silica pigment slurry: | | | | |
| Alkaline silica pigment-I pH 8.5–9.5 | 150 | 150 | 150 | 150 |
| Dry solids basis | 15 | 15 | 15 | 15 |
| Water | 50 | 50 | 50 | 50 |
| (B) Oleophilic quaternary ammonium compound: 10% Redicote E-11 [1] | 1 | 1 | 1 | 1 |
| (C) Combine (A) and (B): Blend [2] | *0.5 | *0.5 | *0.5 | *0.5 |
| (D) Polymer latex: | | | | |
| 63% isobutylene-isoprene [3] | 16 | | | |
| 18.3% butadiene-styrene [4] | | 164 | 164 | 164 |
| Dry solids basis | 10 | 30 | 30 | 30 |
| Antioxidant [5] | 0.2 | 0.6 | 0.6 | 0.6 |
| Water | 280 | 350 | 350 | 350 |
| (E) Coagulant-aqueous solution: | | | | |
| 2% aluminum sulfate [6] | 80 | 90 | | |
| 2% calcium chloride | | | 100 | |
| 2% sulfuric acid | | | | 45 |
| (F) Combine (C) and (D) then (E): | | | | |
| Filter (X) | X | X | X | X |
| Serum pH | 8.0 | 4.5 | 6.8 | 3.5 |
| Silica in serum | None | None | None | None |
| (G) Masterbatch: Dried (105° C.) (X) | X | X | X | X |

[1] A trademark product, reported to be

[2] Waring Blendor, a trademark product.
[3] BP-100 Latex, a butyl latex 63% dry solids.
[4] SBR-1502, a trademark product.
[5] The antioxidant is 2,2'-methylene-bis (4-methyl-6-t.-butylphenol).
[6] Aluminum sulfate $Al_2(SO_4)_3 \cdot 14H_2O$.
*Minute.

The level of oleophilic quaternary ammonium compound in the foregoing Examples 1 to 30, of the order of 1%, is sufficient to render the serum of the masterbatch essentially free of silica pigment. Vulcanizates prepared from the masterbatches so provided have equaled tensile strength and only slightly decreased modulus as compared with similar vulcanizates prepared by dry milling. However, if the quantity of such compound is increased significantly above the order of 1% based on the silica, by weight, e.g. into the range of 2 to 20% dry weight based on the silica, then the modulus of the vulcanizates of the masterbatches is reduced proportionately.

With respect to a further aspect of the invention, it is well known that if a silica pigment precipitated from an alkali metal silicate solution with the aid of carbon dioxide is dried in the alkaline state, it agglomerates to hard lumps which even after griding do not uniformly disperse in dry rubber compositions. For this reason it has been the practice to render such silica pigment precipitates acidic, or at least neutral, e.g. by treatment with mineral acid, before drying the same, in order to render them dispersible. The present invention, as shown in Examples 19 to 22, has disclosed that such practice, and its disadvantages, can be obviated, and that a rubber dispersible dry alkaline silica pigment can be prepared, by treating the slurry of alkaline silica pigment precipitate with oleophilic quaternary ammonium compound before drying. The invention has further disclosed that when the oleophilic quaternary ammonium compound is employed in sufficient quantity to render the dry silica pigment dispersible in dry rubber, and not significantly in excess of such quantity, the resulting dispersible alkaline dry silica pigment is useful for imparting high modulus to vulcanizate in which it is employed in normal compounding proportions. The invention has still further disclosed that by employing augmented amounts of the compound, significantly in excess of those which render the silica so dispersible and which give high modulus vulcanizates, a dry alkaline silica pigment may be obtained which is readily dispersible, and which does not itself impart high modulus to the stocks, but which does impart an improved balance of tensile strength and tear or abrasion resistance to the vulcanizate. And in this connection, the invention has further disclosed that a vulcanizate combining high modules, high tensile strength and high tear of abraision resistance, can be provided by employing a combination of dry treated silica pigment bearing such augmented amount of quaternary ammonium compound with other reinforcing fillers, e.g. carbon black, acidic silica pigments, and dry silica pigments bearing less than such augmented amount of oleophilic compound.

Also the invention has disclosed that, when, as in Examples 23 to 26, the alkaline silica pigment is treated with both the oleophilic quaternary ammonium compound and with reactants selected from the class consisting of the members of the following groups: Group (I), the water soluble salts of aluminum of zinc; Group (II), water soluble acids; and Group (III), combinations of any two or more of such members, dispersible dry alkaline, neutral, or acidic silica pigments are obtainable suitable suitable for rubber compounding, and that by use of augmented quantities of the oleophilic compound, such pigments are enabled to impart improved tear resistance to vulcanizate prepared therewith as above described.

EXAMPLES 31–46

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer latex and heated silica pigment prior to the coagulation thereof by the aqueous coagulant as set forth in the drawing. Such combinations may be effected in any suitable way, e.g. the carbon black may be added as an aqueous slurry and the processing oil as an aqueous dispersion preferably with an anionic emulsifying agent and/or ammonium hydroxide.

The following Examples 31–46 are illustrative of such modes of practicing the invention.

TABLE XII.—POLYMER-SILICA MASTERBATCH INCLUDING CARBON BLACK AND PROCESSING OIL

[Parts by weight]

| Examples | 31 | 32 | 33 | 34 |
|---|---|---|---|---|
| (A) Silica pigment slurry: | | | | |
| Alkaline silica pigment-I pH 8.5–9.5 | 25 | 25 | 25 | 25 |
| Dry basis | 2.5 | 2.5 | 2.5 | 2.5 |
| Water | 60 | 60 | 60 | 60 |
| (B) Reagent aqueous solution: | | | | |
| 2% aluminum sulfate [1] | 8.5 | 8.5 | | |
| 2% calcium chloride | | | 5.0 | 5.0 |
| (C) Oleophilic quaternary ammonium compound: | | | | |
| Arquad 2C-75 [2] | 0.15 | 0.15 | | |
| Arquad C-50 [3] | | | 0.1 | 0.1 |
| (D) Combine (A) and (B) then (C): | | | | |
| Blend | *0.5 | *0.5 | *0.5 | *0.5 |
| (E) Carbon black and/or processing oil: | | | | |
| Philblack O [5] | 2.5 | 2.5 | 2.5 | 2.5 |
| Sundex 2XH [5] | 1 | | | |
| (F) Combine (D) and (E): Blend [4] | *0.5 | *0.5 | *0.5 | *0.5 |
| (G) Polymer latex: | | | | |
| Polychloroprene [6] | 17.3 | | | |
| Butadiene-acrylonitrile [7] | | 24.4 | | |
| Butadiene-styrene [8] | | | 50.6 | 50.6 |
| Dry solids | 10 | 10 | 10 | 10 |
| Water | 80 | 30 | 30 | 30 |
| 28% ammonia, aqueous | 1 | | | |
| Antioxidant [9] | 0.2 | 0.2 | 0.2 | 0.2 |
| (H) Combine (F) and (G): Blend [4] | *1 | *1 | *1 | *1 |
| (I) Coagulant-aqueous solution: | | | | |
| 2% aluminum sulfate [1] | 40 | 18 | | |
| 2% calcium chloride | | | 20 | |
| 2% sulfuric acid | | | | 20 |
| (J) Combine (H) and (I): | | | | |
| Mix (X) | X | X | X | X |
| Serum pH | 4.5 | 4.5 | 6.8 | 4.5 |
| Silica and/or black in serum | None | None | None | None |
| (K) Masterbatch: | | | | |
| Filter and wash (X) | X | X | X | X |
| Dried (105° C.) (X) | X | X | X | X |

[1] Aluminum sulfate Al₂(SO₄)₃·14H₂O.
[2] Arquad 2C-75, a trademark product, dicoco dimethyl ammonium chloride, 75% active.
[3] Arquad C-50, a trademark product, coco trimethyl ammonium chloride, 50% active.
[4] Waring Blendor (a trademark product).
[5] A trademark product.
[6] Neoprene 635 latex, a trademark product (TS=58%).
[7] Hycar 1561, a butadiene/acrylonitrile latex, a trademark product (TS=41%).
[8] SBR-1500 (TS=19.7%).
[9] Antioxidant is 2,2'-methylene-bis(4-methyl-6-t.-butyl phenol).
*Minute.

TABLE XIII.—POLYMER-SILICA MASTERBATCH INCLUDING CARBON BLACK

[Parts by weight]

| Examples | 35 | 36 | 37 | 38 |
|---|---|---|---|---|
| (A) Silica pigment slurry: | | | | |
| Alkaline silica pigment-I pH 8.5–9.5 | 25 | 25 | 25 | 25 |
| Dry basis | 2.5 | 2.5 | 2.5 | 2.5 |
| Water | 60 | 60 | 60 | 60 |
| (B) Reagent aqueous solution: | | | | |
| 2% magnesium sulfate | 5.5 | 5.5 | | |
| 2% zinc sulfate | | | 7.0 | 7.0 |
| (C) Oleophilic quaternary ammonium compound: Arquad T-50 [1] | 0.1 | 0.1 | 0.2 | 0.2 |
| (D) Combine (A) and (B) then (C): | | | | |
| Blend [2] | *0.5 | *0.5 | *0.5 | *0.5 |
| (E) Carbon Black: Thermax [3] | 5.0 | 5.0 | 5.0 | 5.0 |
| (F) Combine (D) and (E): Blend [2] | *0.5 | *0.5 | *0.5 | *0.5 |
| (G) Polymer latex: | | | | |
| Butadiene-styrene [4] | 79 | 79 | 79 | 97 |
| Dry solids | 14.5 | 14.5 | 14.5 | 14.5 |
| Antioxidant [5] | 0.29 | 0.29 | 0.29 | 0.29 |
| (H) Combine (F) and (G): Blend [2] | *1 | *1 | *1 | *1 |
| (I) Coagulant-aqueous solution: | | | | |
| 2% magnesium sulfate | 24 | | | |
| 2% aluminum sulfate [6] | | 12 | | |
| 2% zinc sulfate | | | 32 | 42 |
| (J) Combine (H) and (I): | | | | |
| Mix, (X) | X | X | X | X |
| Serum pH | 6.8 | 3.0 | 5.5 | 4.5 |
| Silica and/or black in serum | None | None | None | None |
| (K) Masterbatch: | | | | |
| Filter and wash (X) | X | X | X | X |
| Dried (105° C.) (X) | X | X | X | X |

[1] Tallow trimethyl quaternary ammonium chloride (50% active).
[2] Waring Blendor, a trademark product.
[3] A trademark product.
[4] SBR-1502 latex (TS=18.4%).
[5] Antioxidant is 2,2'-methylene-bis (4-methyl-6-t-butyl phenol).
[6] Aluminum sulfate Al₂(SO₄)₃·14H₂O.
*Minute.

TABLE XIV.—POLYMER-SILICA MASTERBATCH INCLUDING CARBON BLACK AND PROCESSING OIL

[Parts by weight]

| Examples | 39 | 40 | 41 | 42 |
|---|---|---|---|---|
| (A) Silica pigment slurry: | | | | |
| Alkaline silica pigment-I pH 8.5–9.5 | 25 | 25 | 25 | 25 |
| Dry basis | 2.5 | 2.5 | 2.5 | 2.5 |
| Water | 80 | 80 | 40 | 40 |
| (B) Reagent aqueous solution: 2% sulfuric acid | 4.5 | 4.5 | 4.5 | 4.5 |
| (C) Oleophilic quaternary ammonium compound: | | | | |
| 10% Hyamine 1622 (in benzene)[1] | 2.0 | 2.0 | | |
| Arquad T-50 [2] | | | 0.26 | 0.26 |
| (D) Combine (A) and (B) then (C): | | | | |
| Blend [3] | *0.5 | *0.5 | *0.5 | *0.5 |
| (E) Carbon black and/or processing oil: | | | | |
| Statex 160 HR [4] | | 2.5 | 5.0 | |
| Sundex 2XH [5] | 1.0 | | | 1.0 |
| (F) Combine (D) and (E): Blend [3] | *0.5 | *0.5 | *0.5 | *0.5 |
| (G) Polymer latex: | | | | |
| Butadiene-styrene [6] | 21 | 21 | 52 | 52 |
| Dry solids | 4 | 4 | 10 | 10 |
| Antioxidant [7] | 0.08 | 0.08 | 0.2 | 0.2 |
| (H) Combine (F) and (G): Blend [2] | *1 | *1 | *1 | *1 |
| (I) Coagulant-aqueous solution: | | | | |
| 2% magnesium sulfate | 10 | | | |
| 2% aluminum sulfate [8] | | | 14 | |
| 2% zinc sulfate | | 10 | | |
| 2% sulfuric acid | | | | 8 |
| (J) Combine (H) and (I): | | | | |
| Mix [3], (X) | X | X | X | X |
| Serum pH | 6.4 | 6.4 | 4.5 | 4.0 |
| Silica and/or black in serum | None | None | None | None |
| (K) Masterbatch: | | | | |
| Filter and wash (X) | X | X | X | X |
| Dried (105° C.) (X) | X | X | X | X |

[1] Diisobutylphenoxyethoxyethyl dimethyl benzyl ammonium chloride.
[2] Tallow trimethyl quaternary ammonium chloride (50% active).
[3] Waring Blendor, a trademark product.
[4] Carbon, black, a trademark product.
[5] Process oil, a trademark product.
[6] SBR-1502 latex (TS=18.4%).
[7] Antioxidant is 2,2'-methylene-bis-(4-methyl-6-t.-butyl phenol).
[8] Aluminum sulfate Al₂(SO₄)₃·14H₂O.
*Minute.

TABLE XV.—POLYMER-SILICA MASTERBATCH INCLUDING CARBON BLACK AND PROCESSING OIL

[Parts by weight]

| Examples | 43 | 44 | 45 | 46 |
|---|---|---|---|---|
| (A) Silica pigment slurry: | | | | |
| Alkaline silica pigment-I pH 8.5–9.5 | 25 | 25 | 25 | 25 |
| Dry basis | 2.5 | 2.5 | 2.5 | 2.5 |

TABLE XV.—Continued

| Examples | 43 | 44 | 45 | 4 |
|---|---|---|---|---|
| Water |  |  |  |  |
| (B) Reagent aqueous solution: 2% sulfuric acid | 4.5 | 4.5 | 4.5 | 4.5 |
| (C) Oleophilic quaternary ammonium compound: |  |  |  |  |
| 10% Ethoquad 18-12 (in benzene) [1] | 1.0 | 1.0 |  |  |
| 20% Redicote E-11 (in benzene) [2] |  |  | 1.5 | 1.5 |
| (D) Combine (A) and (B) then (C)· Blend [3] | *0.5 | *0.5 | *0.5 | *0.5 |
| (E) Carbon black and processing oil: |  |  |  |  |
| Statex 160HR [4] | 5.0 | 5.0 | 7.5 | 7.5 |
| Sundex 2XH [5] |  |  | 1.0 | 1.0 |
| (F) Combined (D) and (E): Blend [3] | *0.5 | *0.5 | *0.5 | *0.5 |
| (G) Polymer latex: |  |  |  |  |
| Butadiene-styrene [6] | 78 | 78 | 103 | 103 |
| Dry basis | 15 | 15 | 20 | 20 |
| Antioxidant [7] | 0.3 | 0.3 | 0.3 | 0.3 |
| (H) Combine(F) and (G): Blender [3] | *1 | *1 | *1 | *1 |
| (I) Coagulant-aqueous solution: |  |  |  |  |
| 2% calcium chloride |  | 14 |  |  |
| 2% barium chloride |  |  | 32 |  |
| 2% aluminum sulfate [8] |  |  |  | 28 |
| 2% sulfuric acid |  |  |  | 12 |
| (J) Combine (H) and (I): |  |  |  |  |
| Mix, (X) | X | X | X | X |
| Serum pH | 6.4 | 6.4 | 5.0 | 4.0 |
| Silica and/or black in serum | None | None | None | None |
| (K) Masterbatch: |  |  |  |  |
| Filter and wash (X) | X | X | X | X |
| Dried (105° C.) (X) | X | X | X | X |

[1] See footnote 3, Table IX.
[2] A trademark product, reported to be

[3] Waring Blendor, a trademark product.
[4] Carbon black, a trademark product.
[5] Processing oil, a trademark product.
[6] SBR-1502 latex (TS=18.4%).
[7] Antioxidant is 2,2'-methylene-bis-(4-methyl-6-t.-butyl phenol).
[8] Aluminum sulfate $Al_2(SO_4)_3 \cdot 14H_2O$.
*Minute.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the co-pending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
   (a) an elastomer, and
   (b) aqueously wet silica pigment
   which process comprises the steps of:
   (c) providing an aqueous dispersion containing (1) 100 parts by weight of the elastomer and (2) from 0.5 to 15 parts by weight of anionic dispersing agent;
   (d) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation;
   (e) providing a quantity of from 0.1 to 20% by weight, based on the silica pigment, dry basis, referred to in step (d), of oleophilic quaternary ammonium material;
   (f) providing reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of any two or more of such members;
   (g) combining the wet silica pigment provided by step (d) with the oleophilic material provided by step (e), and from 0 to at least a stoichiometric equivalent, based on the alkalinity of the silica pigment, dry basis, of the reactant provided by step (f);
   (h) then forming a mixture of (1) the aqueous elastomer dispersion provided by step (c); (2) the treated wet silica pigment prepared by step (g); (3) from 0 to 75 parts by weight of carbon black with the limitation that the total of silica pigment and carbon black, dry basis, not exceed 80 parts by weight, (4) from 0 to 45 parts by weight of processing oil; and (5) a sufficient quantity of the reactant material provided in step (f) to cause coagulation of the solids of the combination, whereby there is formed a coagulum of such solids rendering the aqueous serum of the combination essentially free of silica pigment; and
   (i) recovering the coagulum as a masterbatch.

2. A process as claimed in claim 1 in which step (h) is practiced by pre-mixing the aqueous elastomer dispersion provided by step (c) with the treated wet silica pigment prepared by step (g) and then combining such mixture with the reactant material referred to in step (h).

3. A process as claimed in claim 2 in which the combining of the mixture of aqueous elastomer dispersion and treated wet silica pigment with the reactant referred to in step (h) is effected by adding said mixture to an aqueous solution of the reactant.

4. A process as claimed in claim 1, wherein the quantity of quaternary ammonium material provided in step (e) is at least 0.5% by weight, based on the silica pigment referred to in step (d), dry basis.

5. A process as claimed in claim 1, wherein at least 5 parts by weight of the carbon black is included in the mixture formed in step (h).

6. A process as claimed in claim 1, wherein at least 5 parts by weight of processing oil is included in the mixture formed in step (h).

(References on following page)

References Cited

UNITED STATES PATENTS

| | | | |
|---|---|---|---|
| 2,607,753 | 8/1952 | Adams | 260—41 |
| 2,692,863 | 10/1954 | Iler | 252—309 |
| 2,821,232 | 1/1958 | Wolf | 152—330 |
| 3,014,810 | 12/1961 | Dybalski et al. | 106—308 |
| 3,122,518 | 2/1964 | Logemann et al. | 260—41.5 |
| 3,172,726 | 3/1965 | Burke et al. | 23—182 |
| 3,250,594 | 5/1966 | Burke et al. | 23—182 |
| 3,392,140 | 7/1968 | Maahs et al. | 260—41.5 |

OTHER REFERENCES

Whitby G. S.: Synthetic Rubber, John Wiley & Sons, Inc., New York, 1954, pages 670 and 677.

Morton, Maurice: Introduction to Rubber Technology, Reinhold Pub. Corp., New York, 1959, pages 169–171.

MORRIS LIEBMAN, Primary Examiner

J. H. DERRINGTON, Assistant Examiner

U.S. Cl. X.R.

106—308 N; 260—41.5 R, 41.5 A, 41.5 MP